United States Patent
Liou et al.

(10) Patent No.: US 7,969,868 B2
(45) Date of Patent: Jun. 28, 2011

(54) PATH-LEVEL PROTECTION FOR DIGITALLY WRAPPED PAYLOADS

(75) Inventors: Christopher C. Liou, Cupertino, CA (US); Rajasekar Venkatesan, Saratoga, CA (US); Biao Lu, Saratoga, CA (US); George Frank, Pacifica, CA (US)

(73) Assignee: Infinera Corporation, Sunnyvale, CA (US)

( * ) Notice: Subject to any disclaimer, the term of this patent is extended or adjusted under 35 U.S.C. 154(b) by 176 days.

(21) Appl. No.: 12/388,561

(22) Filed: Feb. 19, 2009

(65) Prior Publication Data
US 2010/0208583 A1  Aug. 19, 2010

(51) Int. Cl.
*G01R 31/08* (2006.01)
*H04L 12/26* (2006.01)

(52) U.S. Cl. ......... 370/216; 370/217; 370/225; 370/242

(58) Field of Classification Search .......... 370/217–220, 370/225, 242, 216, 352–356, 226–227
See application file for complete search history.

(56) References Cited

U.S. PATENT DOCUMENTS

| | | | |
|---|---|---|---|
| 6,934,248 B1 * | 8/2005 | DeBoer et al. | 370/217 |
| 6,977,885 B1 * | 12/2005 | Watanuki et al. | 370/216 |
| 7,143,161 B2 | 11/2006 | Brissette | |
| 7,167,443 B1 * | 1/2007 | Dantu et al. | 370/218 |
| 7,280,472 B2 * | 10/2007 | Rigby et al. | 370/230.1 |
| 7,304,954 B1 * | 12/2007 | Gupta et al. | 370/236.1 |
| 7,710,864 B2 * | 5/2010 | Binetti et al. | 370/218 |
| 7,804,767 B1 * | 9/2010 | Owens et al. | 370/217 |
| 2004/0022279 A1 * | 2/2004 | Kailbach et al. | 370/542 |
| 2005/0028043 A1 * | 2/2005 | Loprieno | 714/43 |
| 2006/0123503 A1 * | 6/2006 | Brennan et al. | 800/18 |
| 2006/0126503 A1 * | 6/2006 | Huck et al. | 370/225 |
| 2008/0316920 A1 * | 12/2008 | Chun et al. | 370/225 |

OTHER PUBLICATIONS

Agilent Technologies, "An overview of ITU-T G.709", Agilent Technologies, U.K. Ltd. 2001, pp. 1-12.
J. Lang et al., "Generalized Multi-Protocol Label Switching (GMPLS) Recovery Functional Specification," The Internet Society, Mar. 2006, pp. 1-23.
ITU-T, G.806, Series G: Transmission Systems and Media, Digital Systems and Networks, International Telecommunications Union, Mar. 2006.
ITU-T, G.709/Y.1331, Series G: Transmission Systems and Media, Digital Systems and Networks, International Telecommunications Union, Mar. 2003.
Alan Sorgi et al., "Implementing 10-Gbit digital-wrapper for efficient transport over OC-192," Lightwave, Dec. 1, 2000.

* cited by examiner

*Primary Examiner* — Kwang B Yao
*Assistant Examiner* — Candal Elpenord
(74) *Attorney, Agent, or Firm* — David L. Soltz; Harrity & Harrity, LLP (57) ABSTRACT

A node, of a group of nodes, may detect a failure on a first path; establish a connection associated with a second path when the failure on the first path is detected; store an identifier in a field in an overhead portion of a data frame when the failure on the first path is detected, the data frame including a payload portion that contains a client signal, the identifier instructing another one of the nodes to establish a connection associated with the second path; and transmit the data frame to the other one of the nodes via the second path.

25 Claims, 9 Drawing Sheets

PATH-LEVEL PROTECTION FOR DIGITALLY WRAPPED PAYLOADS

BACKGROUND

As demand on the world's communication networks increases, new protocols emerge. One such protocol is called Generalized Multi-Protocol Label Switching (GMPLS). GMPLS enhances the MPLS architecture by separating the control and data planes of various networking layers. GMPLS enables a seamless interconnection and convergence of new and legacy networks by allowing end-to-end provisioning, control, and traffic engineering.

A label-switched path (LSP) may be subject to local (span), segment, and/or end-to-end recovery. Local span protection refers to the protection of the link (and hence all the LSPs marked as required for span protection and routed over the link) between two neighboring network nodes. Segment protection refers to the recovery of an LSP segment between two nodes (i.e., the boundary nodes of the segment). End-to-end protection refers to the protection of an entire LSP from the ingress (source) node to the egress (destination) node.

There are three fundamental models for span protection. The first model is referred to as 1+1 protection model, the second model is referred to as a 1+N protection model, and the third model is referred to as shared (mesh) protection model. With the 1+1 protection model, a dedicated, protection path is pre-assigned to protect a working path. LSP traffic is permanently bridged onto both paths (working and protection) at the ingress node, and the egress node selects the signal (i.e., normal traffic) from the working or protection path. Under unidirectional 1+1 span protection, the ingress node and the egress node act autonomously to select the signal from the working path or the protection path. Under bi-directional 1+1 span protection, the ingress node and the egress node coordinate the selection function such that they select the signal from the same path: working path or protection path.

With the 1+N protection model, a protection path is pre-assigned to protect a set of N working paths. A failure in any of the N working paths results in traffic being switched to the protection path. This is typically a two-step process: first the data plane failure is detected at the egress node and reported to the ingress node, and the LSPs on the failed path are moved to the protection path.

With the shared (mesh) protection model, a set of N working paths are protected by a set of M protection paths, usually with $M \leq N$. A failure in any of the N working paths results in traffic being switched to one of the M protection paths. This is typically a three-step process: first the data plane failure is detected at the egress node and reported to the ingress node, a protection path is selected, and the LSPs on the failed path are moved to the protection path.

SUMMARY

According to one implementation, a first node, of a group of nodes connected by links associated with first and second paths, may include one or more components to detect a failure on the first path, establish a connection associated with the second path when the failure on the first path is detected, encode a circuit identifier within a field in an overhead portion of a data frame that carries a client signal when the failure on the first path is detected, the circuit identifier instructing a second one of the nodes to establish a connection associated with the second path, and transmit the data frame with the encoded circuit identifier to the second node via the second path.

According to another implementation, a method, performed by a node of a group of nodes, may include detecting a failure on a first path; establishing a connection associated with a second path when the failure on the first path is detected; storing an identifier in a field in an overhead portion of a data frame when the failure on the first path is detected, the data frame including a payload portion that contains a client signal, the identifier instructing another one of the nodes to establish a connection associated with the second path; and transmitting the data frame to the other node via the second path.

According to yet another implementation, a node, of a group of nodes associated with first and second paths, may include one or more components to receive a data frame from another one of the nodes, the data frame including a payload portion storing a client signal, and an overhead portion storing an encoded circuit identifier, the encoded circuit identifier informing the node of an occurrence of a failure on the first path and instructing the node to establish a connection associated with the second path, establish, based on the encoded circuit identifier, the connection associated with the second path, and transmit the data frame to a further one of the nodes via the second path.

According to a further implementation, a method, performed by a node of a group of nodes, may include receiving a data frame from another one of the nodes, the data frame including a payload portion storing a client signal, and an overhead portion storing an encoded identifier, the encoded identifier informing the node of an occurrence of a failure on the first path and instructing the node to establish a connection associated with the second path; establishing, based on the encoded identifier, the connection associated with the second path; and transmitting the data frame to a further one of the nodes via the second path.

According to another implementation, a network may include an ingress node, an egress node, and an intermediate node. The ingress node, the egress node, and the intermediate node may be connected via first links associated with a first path, and via second links associated with a second path. The ingress node may detect a failure on the first path, establish a connection associated with the second path when the failure on the first path is detected, encode an identifier within a field in an overhead portion of a data frame that carries a client signal when the failure on the first path is detected, the identifier instructing the intermediate node to establish a connection associated with the second path, and transmit the data frame with the encoded identifier to the intermediate node via the second path. The intermediate node may receive the data frame from the ingress node, identify, via the encoded identifier, that a switch-over is to occur to the second path, establish, based on the encoded identifier, the connection associated with the second path, and transmit the data frame on the second path.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Implementations, described herein, may achieve path-level restoration by leveraging shared protection capacity in a network. These implementations may encode a circuit identifier in a field of an overhead portion of a data frame that carries a client payload, and send this encoded circuit identifier on a protection path to activate the protection path, without relying on higher layer signaling protocols. As described herein, these implementations may send the data frame over the protection path to instruct nodes to switch-over from a failed working path to the protection path. Based on the implementations, described herein, rapid restoration of service can be achieved with any number of transport payload types, such as Gigabit Ethernet (GbE), 2xGbE, Fibre Channel (FC), IGFC, 10GbE LAN Phy, 10GbE WAN Phy, Synchronous Transport Mode 16 (STM-16), STM-64, Optical Carrier level 48 (OC-48), and OC-192.

Exemplary Network

Figure 1:
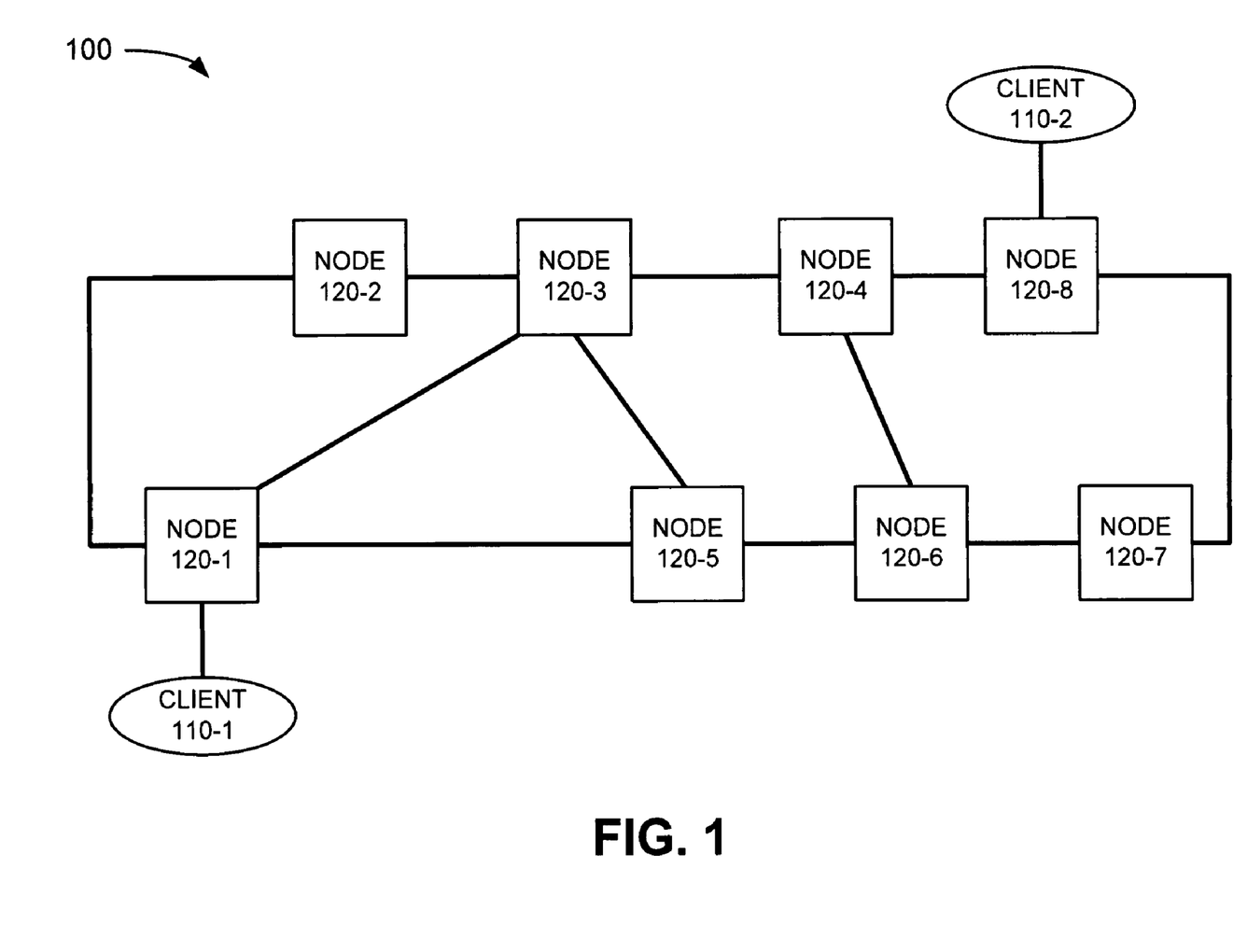
FIG. 1 is a diagram of an exemplary network in which systems and/or methods described herein may be implemented.

FIG. 1 is a diagram of an exemplary network 100 in which systems and/or methods described herein may be implemented. For example, network 100 may include clients 110-1 and 110-2 (referred to collectively as "clients 110," and individually as "client 110") and nodes 120-1, . . . , 120-8 (referred to collectively as "nodes 120," and individually as "node 120"). While FIG. 1 shows a particular number and arrangement of devices, network 100 may include additional, fewer, different, or differently arranged devices than those illustrated in FIG. 1. Also, the connections between devices may be direct or indirect connections.

Client 110 may include any type of network device, such as a router, a switch, or a central office, that may transmit data traffic. In one implementation, client 110 may transmit a client signal (e.g., a synchronous optical network (SONET) signal, a synchronous digital hierarchy (SDH) signal, an Ethernet signal, or another type of signal) to a node 120. The client signal may conform to any payload type, such as the payload types identified above.

Node 120 may include a digital switching device or a dense wavelength division multiplexing (DWDM) device. For example, node 120 may perform optical multiplexing operations (e.g., receive individual client signals on individual optical links and generate a multi-wavelength signal that may be transmitted on a single optical link), optical amplification operations (e.g., amplify the multi-wavelength signal), optical add-drop multiplexing operations (e.g., remove one or more client signals from the multi-wavelength signal), and/or optical demultiplexing operations (e.g., receive the multi-wavelength signal and separate the multi-wavelength signal back into individual client signals that may be transmitted on individual optical links). To perform these operations, node 120 may contain various components, such as an optical multiplexer (to perform the optical multiplexing operations), an optical amplifier (to perform the optical amplification operations), an optical add-drop multiplexer (e.g., a remotely configurable add/drop multiplexer (ROADM)) (to perform the optical add-drop multiplexing operations), and/or an optical demultiplexer (to perform the optical demultiplexing operations).

Nodes 120 may be connected via optical links and may collectively form a GMPLS network. An optical link may include one or more channels or sub-channels that carry data traffic from one node 120 to another node 120. For the purpose of the discussion below, assume that node 120-1 is an ingress (source) node, node 120-8 is an egress (destination) node, and nodes 120-2 through 120-7 are intermediate nodes. Data traffic may flow from the ingress node to the egress node over a series of channels/sub-channels forming a path.

Any two nodes 120 may connect via multiple optical links. A "working path" may refer to a set of channels/sub-channels associated with one or more optical links between two nodes 120 (e.g., between the ingress node and the egress node). A "protection path" may refer to a set of channels/sub-channels associated with one or more optical links between two nodes 120 (e.g., between the ingress node and the egress node). In practice, there may be N working paths and M protection paths between two nodes 120, where M≦N. In one implementation, the protection path may traverse a different set of nodes (where one or more of the nodes differ) from the working path that the protection path is configured to support. In another implementation, the protection path may traverse the same set of the nodes as the working path. Additionally, or alternatively, the protection path may share at least some of the same links with the working path. The protection path may be pre-signal, or pre-provisioned, end-to-end without reserving bandwidth. In one implementation, GMPLS may be used to pre-signal the protection path.

Generally, when a failure occurs on a working path, the ingress node may be notified. The ingress node may select one of the protection paths and move the data traffic from the working path to the selected protection path. The ingress node may notify the egress node and the intermediate nodes, on the selected protection path, to use the selected protection path.

Exemplary Components of Node

Figure 2:
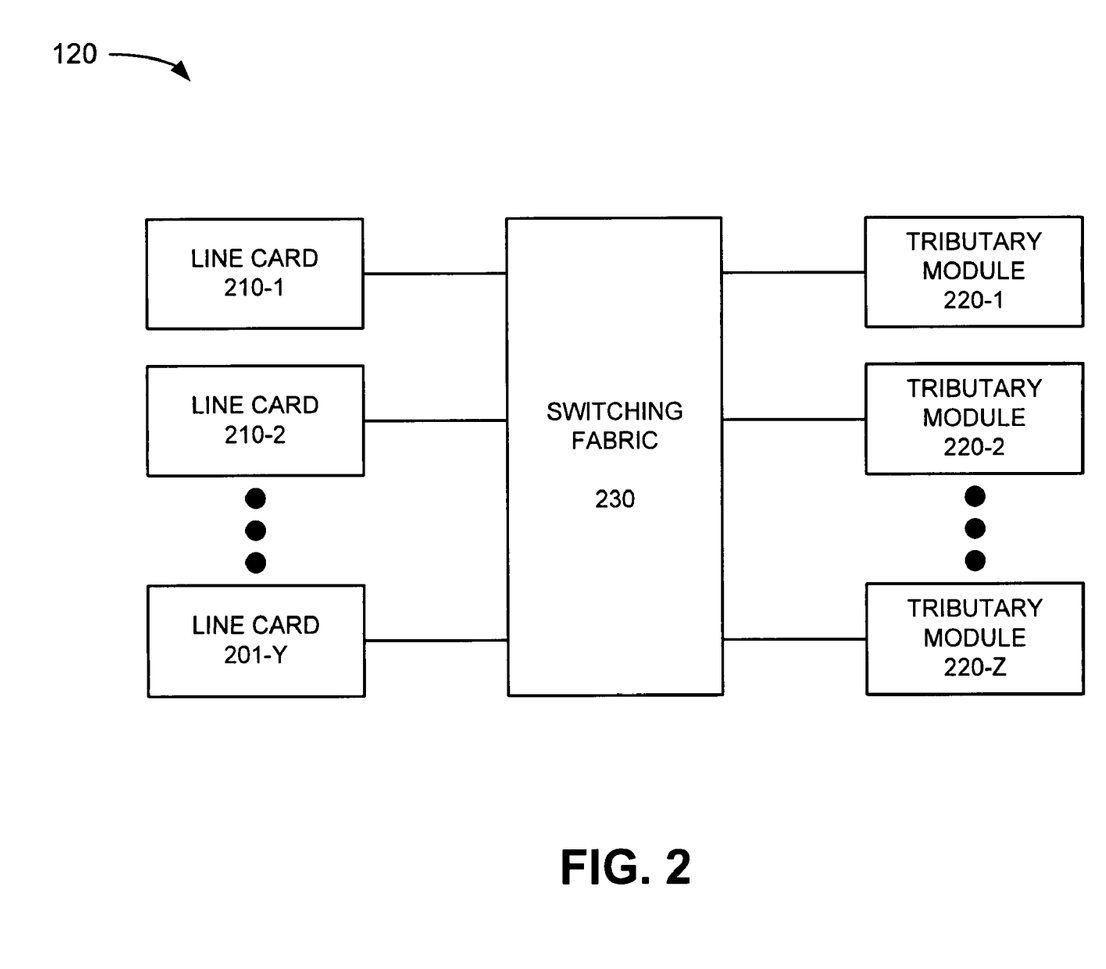
FIG. 2 is a diagram of exemplary components of a node of FIG. 1.

FIG. 2 is a diagram of exemplary components of node 120. As shown in FIG. 2, node 120 may include line cards 210-1, 210-2, . . . , 210-Y (referred to collectively as "line cards 210," and individually as "line card 210") (where Y≧1) and tributary modules 220-1, 220-2, . . . 220-Z Z (referred to collectively as "tributary modules 220," and individually as "tributary module 220") (where Z≧0) connected via switching fabric 230. While FIG. 2 shows a particular number and arrangement of components, node 120 may include additional, fewer, different, or differently arranged components than those illustrated in FIG. 2. For example, node 120 may alternatively, or additionally, include digital switching components.

Line card 210 may include components that may provide retiming, reshaping, regeneration, and/or recoding services for each optical wavelength. Line card 210 may include a receiver photonic integrated circuit (PIC) and/or a transmitter PIC. The receiver PIC may receive a multi-wavelength signal, separate the multi-wavelength signal into client signals of individual wavelengths, and convert the client signals to digital form. The transmitter PIC may convert client signals from digital form, combine the client signals of the individual wavelengths into a multi-wavelength signal, and transmit the multi-wavelength signal. Line card 210 may also include add-drop circuitry to remove one or more client signals from the multi-wavelength signal.

Tributary module 220 may include hardware components, or a combination of hardware and software components, that may terminate client signals. For example, tributary module 220 may support flexible adding-dropping of multiple services, such as SONET/SDH services, GbE services, optical transport network (OTN) services, and FC services. Tributary module 220 may encapsulate client signals in a data frame, as described below. The data frame may permit all types of services to be transparent and robustly managed.

Switch fabric 230 may include one or more switching modules operating in one or more switching planes. Each switching module may permit a cross-connect to be established between two line cards 210 or between a line card 210 and a tributary module 220. In one implementation, the switching modules are non-blocking and/or hot-swappable.

Data Frame Overview

Implementations described herein may facilitate path-level restoration using information, in a data frame transmitted over a data layer (of a protection path), that instructs network nodes to switch over from a working path to the protection path. These implementations may encode a circuit identifier in a field of an overhead portion of the data frame, and use this encoded circuit identifier to activate the protection path.

Figure 3:
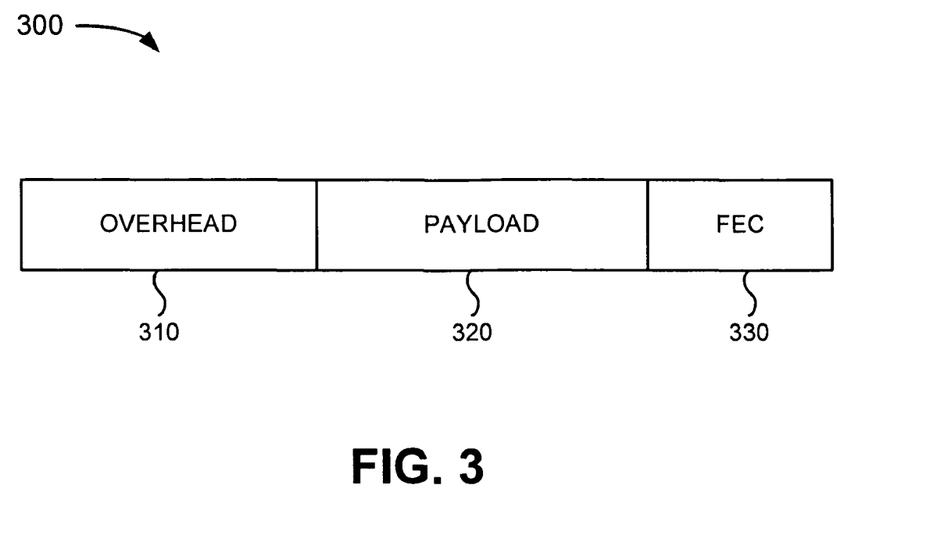
FIGS. 3-6 are diagrams of exemplary fields of a data frame that may be transmitted within the network of FIG. 1.

FIG. 3 is a diagram of exemplary fields of a data frame 300. While FIG. 3 shows a particular arrangement of data fields, data frame 300 may include additional, fewer, different, or differently arranged fields than those illustrated in FIG. 3.

As shown in FIG. 3, data frame 300 may include an overhead portion 310, a payload portion 320, and a forward error control (FEC) portion 330. Overhead portion 310 may store various information relating to the transmission and/or processing of data frame 300. In one implementation, overhead portion 310 may store data to support operation, administration, and/or maintenance functions. Payload portion 320 may store data associated with a client signal. FEC portion 330 may store coded data that facilitates error checking and correction.

Figure 4:
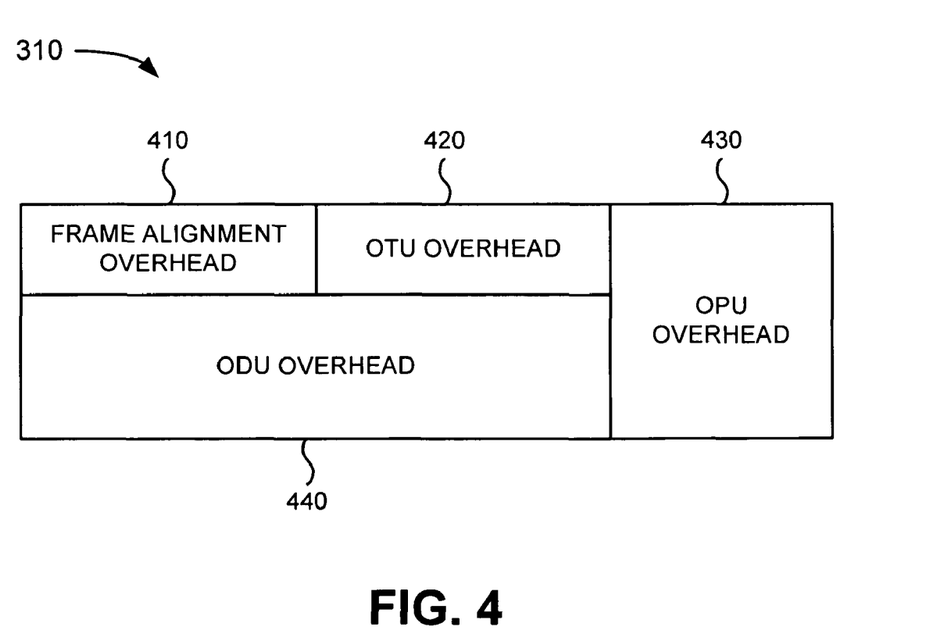

FIG. 4 is a diagram of exemplary fields of overhead portion 310. While FIG. 4 shows a particular arrangement of data fields, overhead portion 310 may include additional, fewer, different, or differently arranged fields than those illustrated in FIG. 4. For example, in the description to follow, assume that overhead portion 310 includes one or more fields similar to the fields included in an ITU-T G.709 frame. In other implementations, overhead portion 310 may include one or more fields common to other data frame formats.

As shown in FIG. 4, overhead portion 310 may include frame alignment overhead field 410, optical transport unit (OTU) field 420, optical payload unit (OPU) field 430, and optical data unit (ODU) field 440. Frame alignment overhead field 410 may store data to identify a starting point of the client signal within the payload portion 320. OTU overhead field 420 may store data that facilitates supervisory functions. OPU overhead field 430 may store data that supports the adaptation of client signals. The data stored in OPU overhead field 430 may vary depending on the client signal being mapped into payload portion 320. ODU overhead field 440 may store data that may provide tandem connection monitoring (TCM) and end-to-end path supervision.

Figure 5:
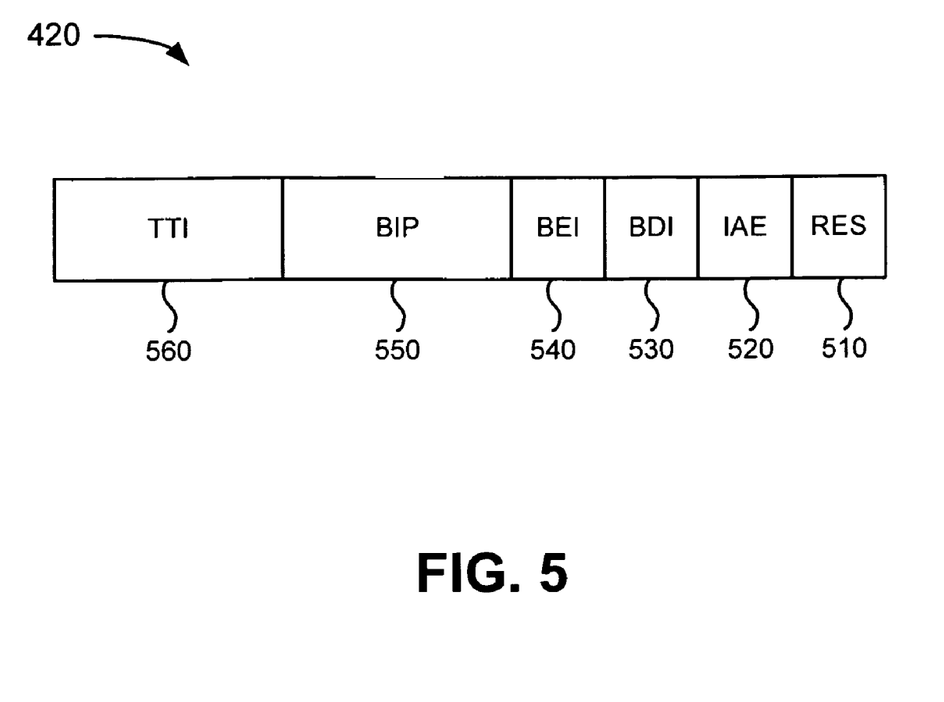

FIG. 5 is a diagram of exemplary fields of OTU overhead field 420. While FIG. 5 shows a particular arrangement of data fields, OTU overhead field 420 may include additional, fewer, different, or differently arranged fields than those illustrated in FIG. 5.

As shown in FIG. 5, OTU overhead field 420 may include reserved (RES) field 510, incoming alignment error (IAE) field 520, backward defect indication (BDI) field 530, backward error indicator (BEI) field 540, bit interleaved parity (BIP) field 550, and trail trace identifier (TTI) field 560. RES field 510 may be reserved for future use. IAE field 520 may store data that may indicate that an alignment error has been detected on the incoming signal. BDI field 530 may store data that may convey a signal-fail status in the upstream direction for section monitoring. BEI field 540 may store data that can signal upstream the number of bit-interleaved blocks that have been identified as having an error. BIP field 550 may store data that may be used for in-service performance monitoring.

Figure 6:
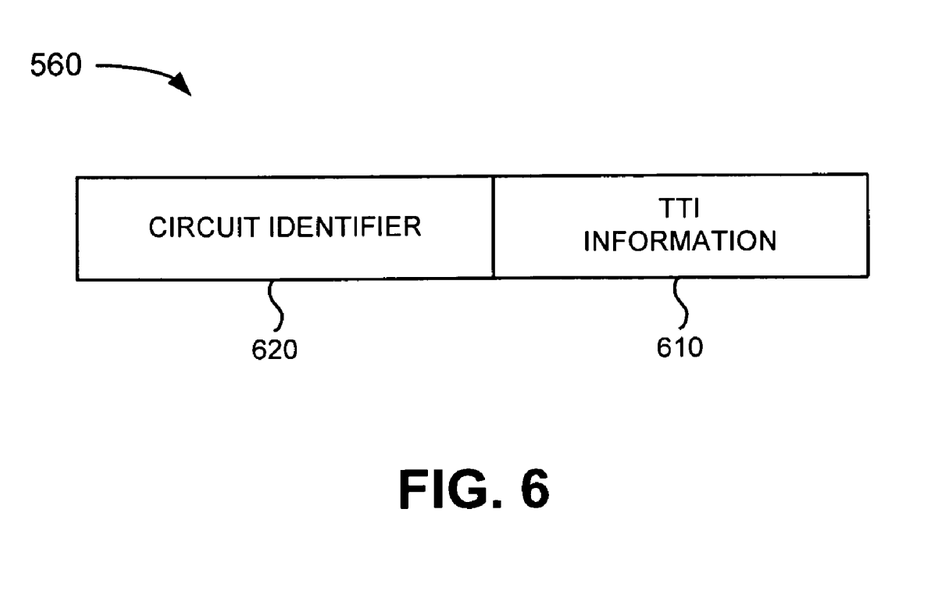

TTI field 560 may store data, such as source and destination identifiers and/or an encoded circuit identifier. FIG. 6 is a diagram of exemplary fields of TTI field 560. While FIG. 6 shows a particular arrangement of data fields, TTI field 560 may include additional, fewer, different, or differently arranged fields than those illustrated in FIG. 6.

Figure 7:
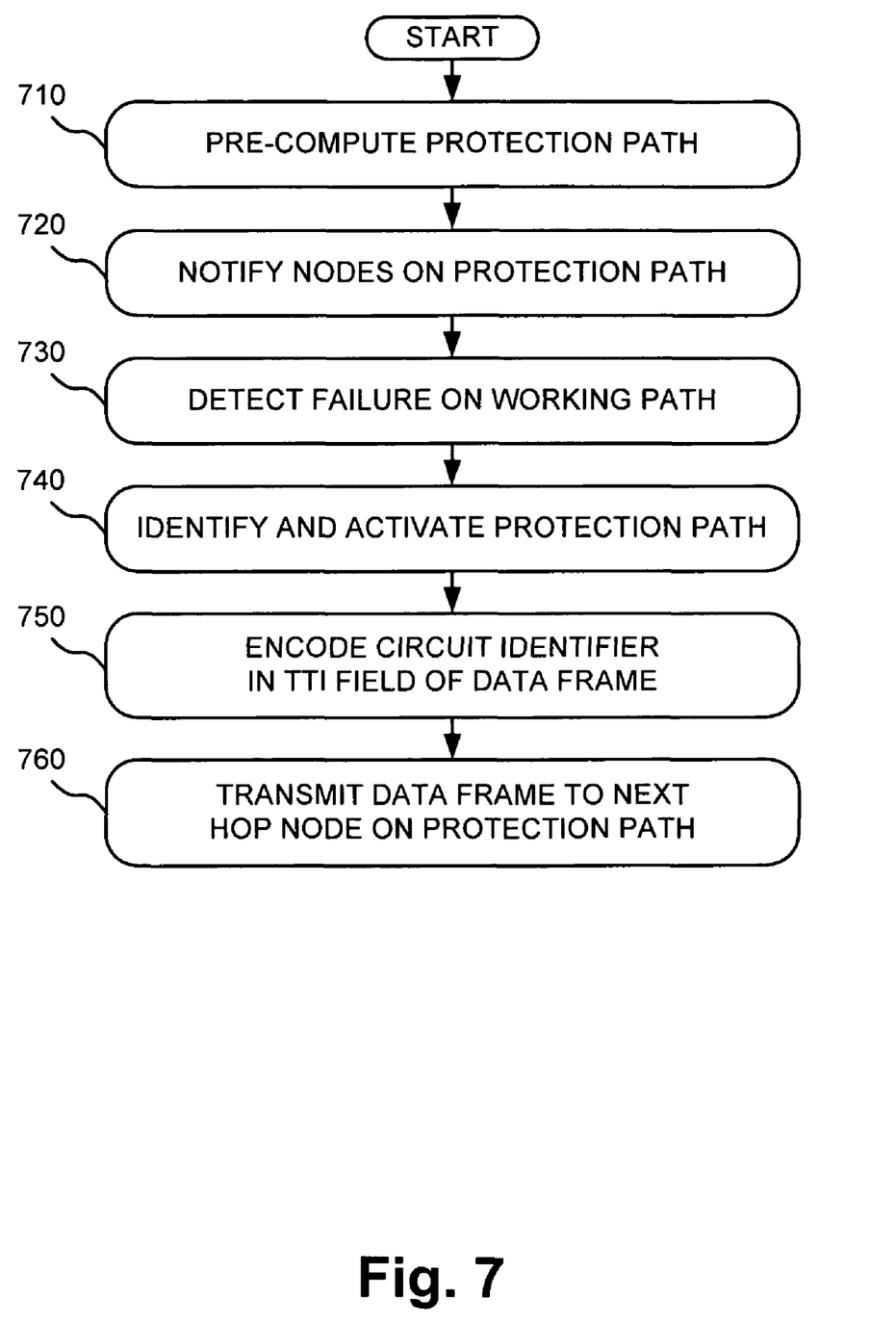
FIG. 7 is a flowchart of an exemplary process for initiating activation of a protection path by an ingress node.

As shown in FIG. 6, TTI field 560 may include TTI information field 610 and circuit identifier field 620. TTI information field 610 may store a source identifier and a destination identifier that may be used to route data frame 300 through network 100. In one implementation, the source and destination identifiers may correspond to identifiers associated with the ingress and egress nodes, respectively. Circuit identifier field 620 may store an encoded circuit identifier that corresponds to a protection path. In one implementation, the circuit identifier may be unique within network 100. In another implementation, the circuit identifier may be locally unique (i.e., between two nodes 120). The circuit identifier may instruct other nodes 120 to activate a protection path, and may be used, for example, as an index into a table that may store information to facilitate the activation of the protection path (when a failure occurs on a working path). In one implementation, circuit identifier field 620 may occupy the space that was previously available to operator-specific information (e.g., see ITU-T G.709, section 15.2, pages 30-32). In another implementation, circuit identifier field 620 may reside elsewhere within overhead portion 310, whether in the data frame format described above or in another data frame format, Exemplary Processes for Activating a Protection Path FIG. 7 is a flowchart of an exemplary process for initiating activation of a protection path. In one implementation, the process of FIG. 7 may be performed by the ingress node (e.g., one or more components of the ingress node, such as line card 210). In another implementation, the process of FIG. 7 may be performed by another node or a set of nodes, either alone or in conjunction with the ingress node.

The process of FIG. 7 may begin with a protection path being pre-computed (block 710). For example, one or more protection paths may be pre-assigned to one or more working paths. A protection path may be available for use when a failure occurs on a working path to which the protection path has been pre-assigned. In one implementation, the protection path may traverse a different set of nodes (or links) than the working path. In another implementation, the protection path may traverse one or more of the same nodes (or links) as the working path. The protection path may be pre-signal, or pre-provisioned, end-to-end without reserving bandwidth. In one implementation, GMPLS may be used to pre-signal the protection path.

The pre-computing of the protection path may involve the storing of a circuit identifier, corresponding to the protection path, in a table along with information that may be used by a node to activate the protection path (e.g., bandwidth parameters). In one implementation, the table may store, for example, a circuit identifier, information that identifies a protection path, and/or information that may be used to activate the protection path.

The nodes on the protection path may be notified (block 720). For example, the ingress node may send or exchange messages with the other nodes on the protection path to inform the other nodes of the protection path, the working path(s) to which the protection path is pre-assigned, and/or information that may be used to activate the protection path.

A failure on a working path may be detected (block 730). For example, a failure on a link along the working path may occur. This failure may be detected by a node connected to that link. For example, the failure may be detected via a loss of signal at the node, or may be detected via receipt of a particular failure signal, such as an alarm indication signal (AIS) or a remote defect indication (RDI) signal. The node detecting the failure may send an appropriate signal to the ingress node. This signal may be transmitted on the working path or a path separate from the working path.

A protection path may be identified and activated (block 740). For example, when the ingress node detects a failure on the working path, the ingress node may invoke a process to allocate a protection path. Any process may be used by the ingress node to select a protection path from the set of protection paths available for the failed working path. For example, a protection path may be selected based on the amount of bandwidth to be transferred from the failed working path and the amount of bandwidth available on the protection path. Alternatively, or additionally, the available protection paths may be assigned priorities and one of the protection paths may be selected based on the assigned priorities.

The ingress node may activate the identified protection path. For example, the ingress node may establish a connection associated with the protection path. In one implementation, the ingress node may set up an appropriate cross-connect through switch fabric 230 (FIG. 2). The cross-connect through switch fabric 230 may connect the data traffic, previously sent on a link associated with the working path, to a link associated with the protection path.

A circuit identifier may be encoded in TTI field 560 of a data frame (block 750). For example, the ingress node may obtain the circuit identifier corresponding to the protection path from, for example, a table. As described above, the circuit identifier may be unique within network 100, or may be locally unique between the ingress node and the intermediate node representing the next hop on the protection path. The ingress node may encode the circuit identifier within circuit identifier field 620 (FIG. 6) of the data frame (e.g., data frame 300).

The data frame may be transmitted to the next hop node on the protection path (block 760). For example, the ingress node may output the data frame on the link to the next hop (intermediate) node.

Figure 8:
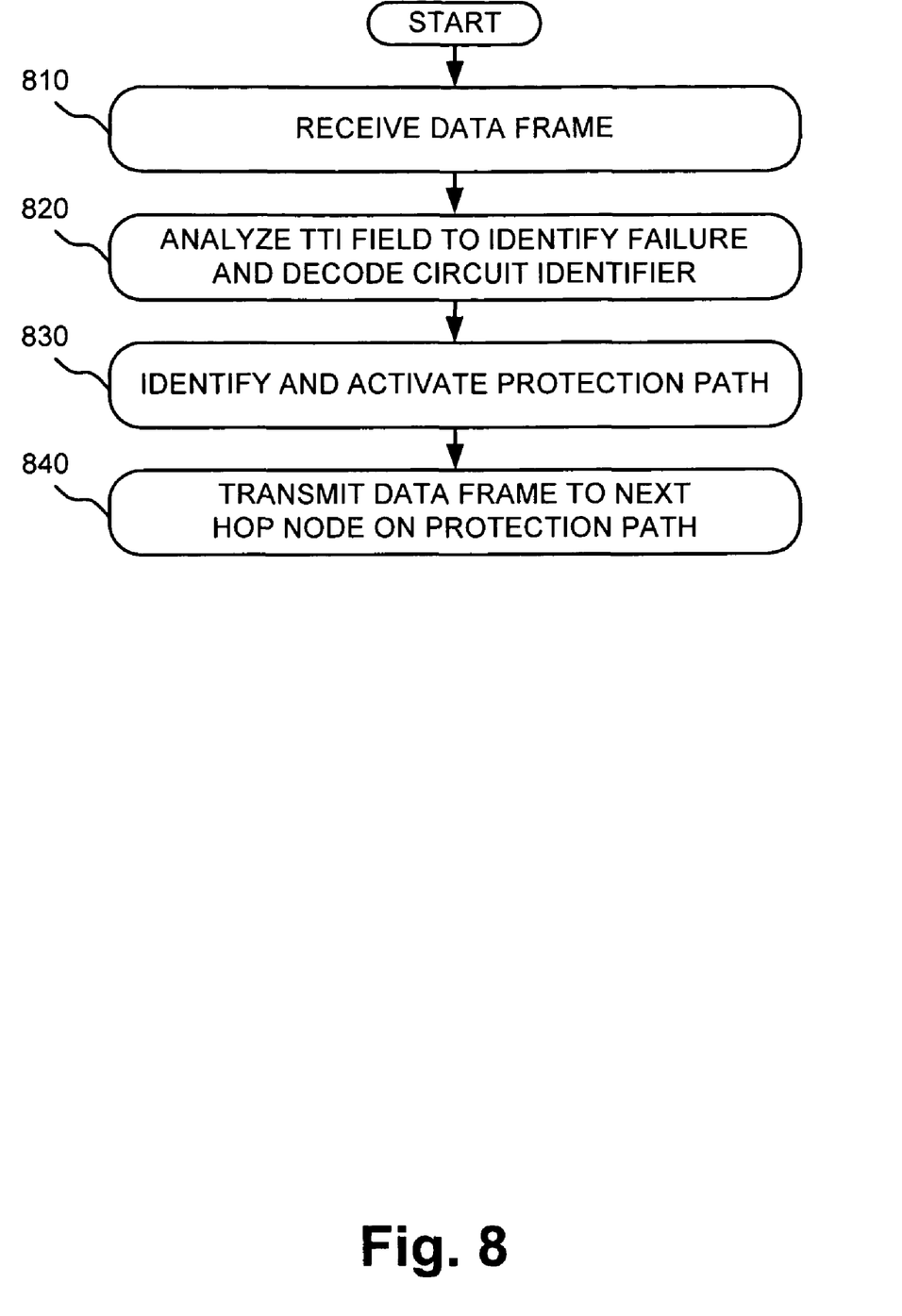
FIG. 8 is a flowchart of an exemplary process for initiating activation of a protection path by an intermediate node.

FIG. 8 is a flowchart of an exemplary process for initiating activation of a protection path. In one implementation, the process of FIG. 8 may be performed by an intermediate node (e.g., one or more components of the intermediate node, such as line card 210). In another implementation, the process of FIG. 8 may be performed by another node (e.g., egress node) or a set of nodes, either alone or in conjunction with the intermediate node.

The process of FIG. 8 may begin with a data frame being received (block 810). For example, the intermediate node may receive the data frame transmitted by the ingress node. The intermediate node may receive the data from the protection path either directly from the ingress node or indirectly from the ingress node via one or more other intermediate nodes.

TTI field 560 of the data frame may be analyzed to identify that a failure exists (block 820). In one implementation, the intermediate node may compare the data in TTI field 560 to data in TTI field 560 of one or more prior data frames. When the data in TTI field 560 differs from the data in TTI field 560 of the one or more prior data frames, the intermediate node may determine that a failure has occurred and may use this information to trigger the reading of data from circuit identifier field 620 of TTI field 560. In one implementation, the intermediate node may wait for the data in TTI field 560 to stabilize before determining that a failure has occurred. For example, the data in TTI field 560 may change from data frame-to-data frame. The intermediate node may wait until the data in TTI field 560 stops changing before determining that a failure has occurred.

The circuit identifier may be decoded from TTI field 560 (block 820). For example, the intermediate node may decode the encoded circuit identifier from circuit identifier field 620 of TTI field 560.

A protection path may be identified and activated (block 830). For example, the intermediate node may use the circuit identifier as an index into a table to identify the protection path. The intermediate node may use information from the table to establish a connection associated with the protection path. In one implementation, the intermediate node may set up a cross-connect through switch fabric 230 (FIG. 2), thereby activating the protection path.

The data frame may be transmitted to the next hop node on the protection path (block 840). For example, the intermediate node may output the data frame on the link to the next hop (intermediate or egress) node.

Example

Figure 9:
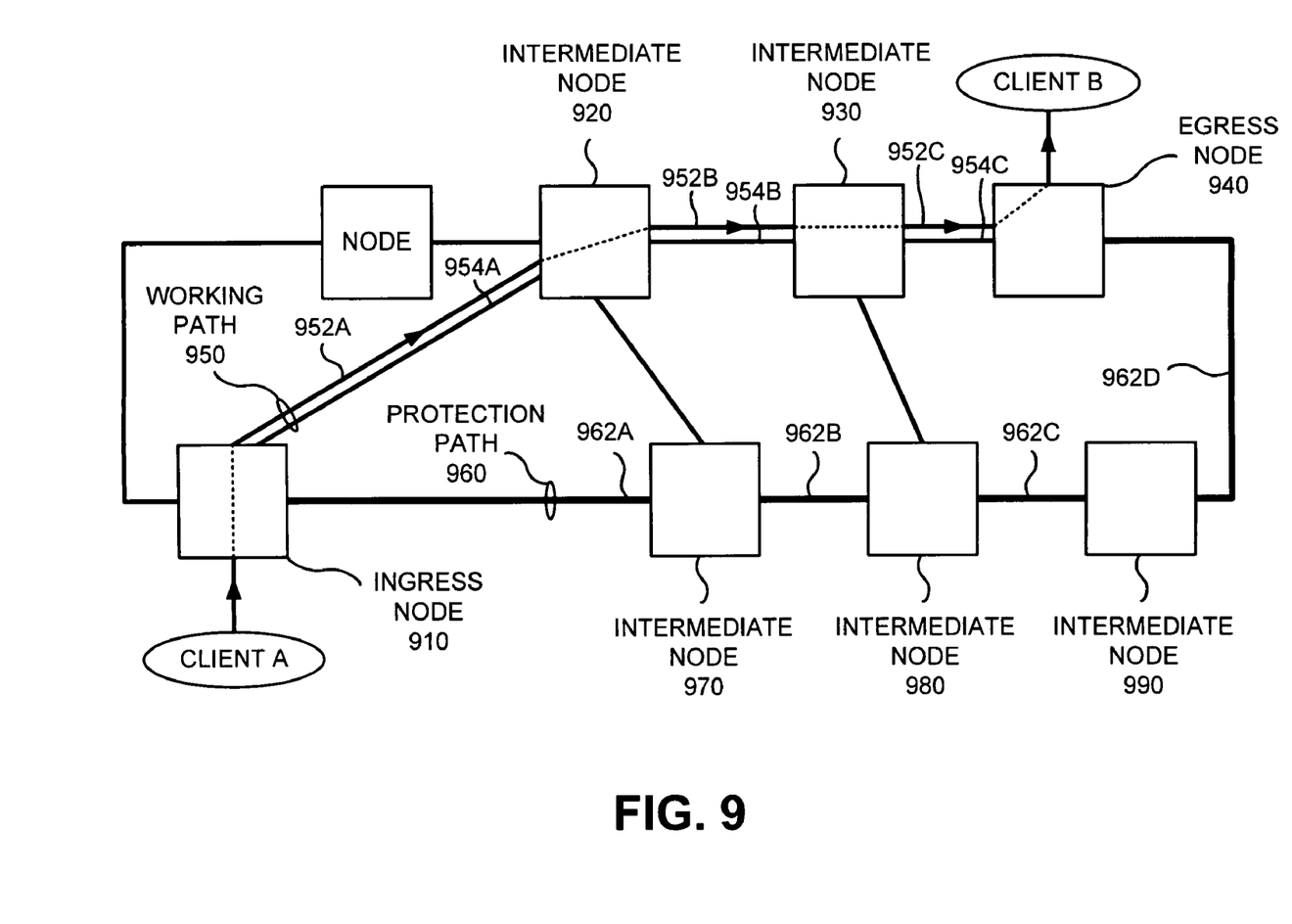
FIGS. 9-11 are diagrams illustrating a switch-over to a protection path.
Figure 10:
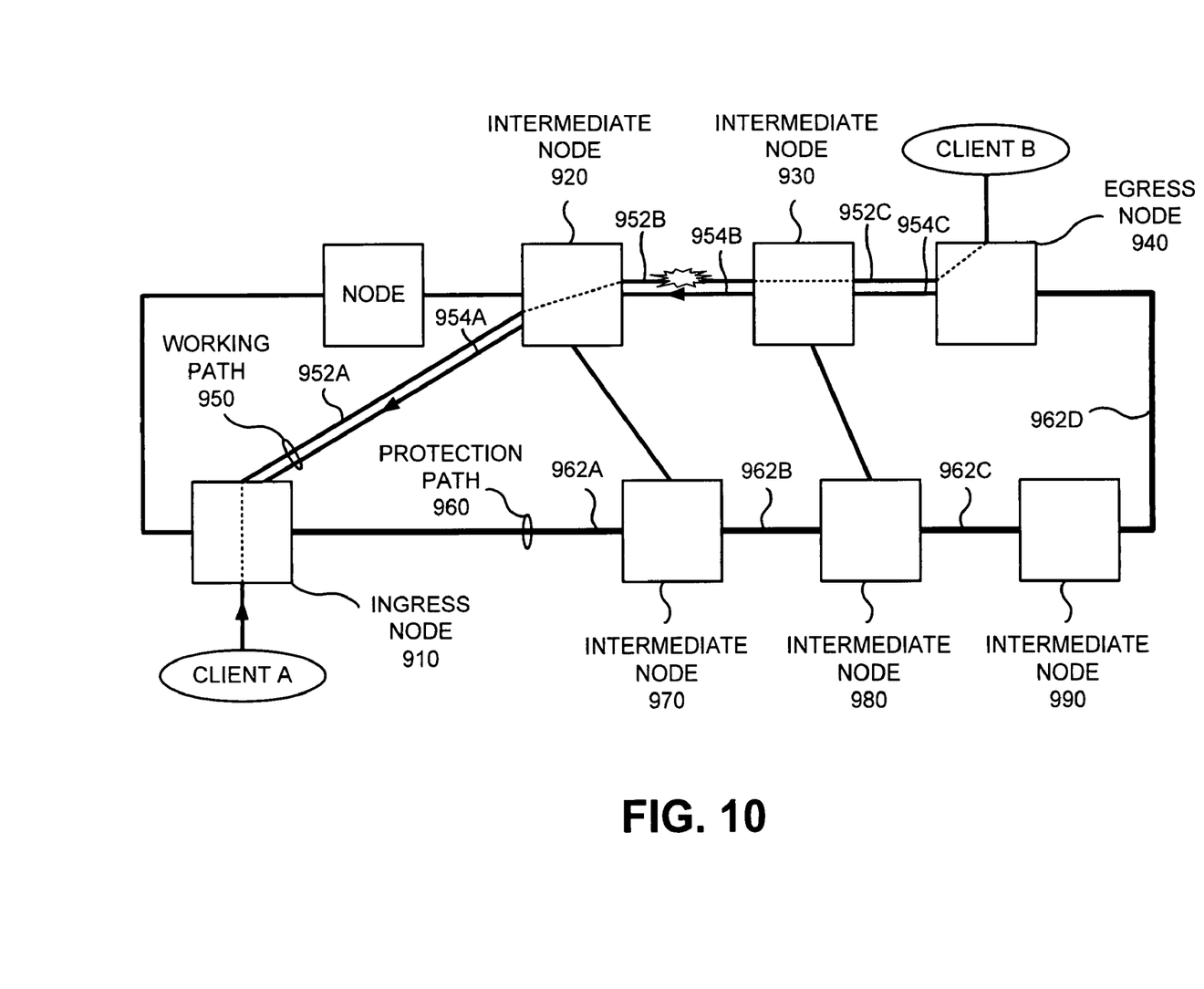
Figure 11:
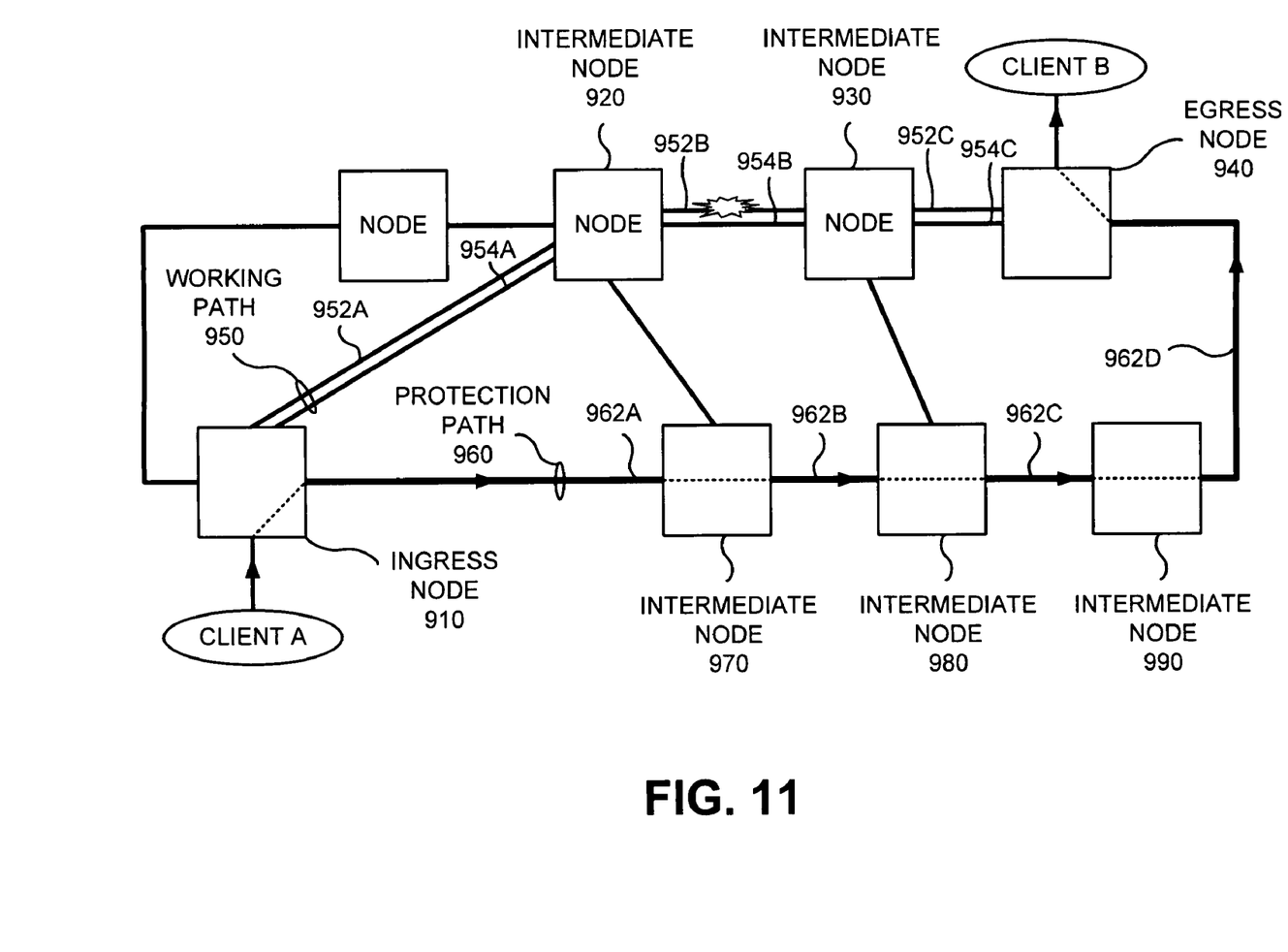

FIGS. 9-11 are diagrams illustrating a switch-over to a protection path. As shown in FIG. 9, a network includes ingress node 910, intermediate node 920, intermediate node 930, and egress node 940 connected via a working path 950. Working path 950 connects the ingress node 910 to the egress node 940. Working path 950 includes a set of channels/sub-channels (associated with links 952A, 952B, and 952C) for transmitting data from ingress node 910 to egress node 940, and a set of channels/sub-channels (associated with links 954A, 954B, and 954C) for transmitting data from egress node 940 to ingress node 910. A protection path 960 is pre-computed and pre-assigned to working path 950. Protection path 960 includes a set of channels/sub-channels (associated with links 962A, 962B, 962C, and 962D) for transmitting data from ingress node 910 to egress node 940 via intermediate node 970, intermediate node 980, and intermediate node 990.

As shown in FIG. 10, assume that a failure occurs on working path 950 between intermediate nodes 920 and 930 (at link 952B). Intermediate node 930 may detect the failure through a loss of received signal. Intermediate 930 may notify ingress node 910 of the failure by sending a particular signal to ingress node 910 via, for example, one or more channels/sub-channels on links 954B and 954A.

As shown in FIG. 11, ingress node 910 may activate the protection by, for example, setting up a cross-connect through its switch fabric. In other words, ingress node 910 may establish a cross-connect to connect the signal from client A to a channel/sub-channel of link 962A. Ingress node 910 may encode a circuit identifier, corresponding to protection path 960, in a data frame that also includes the client signal in its payload. Ingress node 910 may send the data frame to intermediate node 970 via the channel/sub-channel of link 962A.

Intermediate node 970 may receive the data frame via the channel/sub-channel of link 962A. Assume that intermediate node 970 recognizes that a switch-over is to occur to protection path 960 based on the data in the data frame. Intermediate node 970 may read the encoded circuit identifier from the data frame and use the circuit identifier to identify protection path 960 and obtain information to facilitate establishing a cross-connect through the switch fabric of intermediate node 970. Intermediate node 970 may send the data frame to intermediate node 980 via a channel/sub-channel of link 962B. In the situation where the circuit identifier is only locally unique, intermediate node 970 may modify the data frame (e.g., by replacing the encoded circuit identifier with an encoded circuit identifier that is unique between intermediate node 970 and intermediate node 980), and transmit the modified data frame to intermediate node 980 via the channel/sub-channel of link 962B.

Intermediate node 980 may receive the data frame via the channel/sub-channel of link 962B. Assume that intermediate node 980 recognizes that a switch-over is to occur to protection path 960 based on the data in the data frame. Intermediate node 980 may read the encoded circuit identifier from the data frame and use the circuit identifier to identify protection path 960 and obtain information to facilitate establishing a cross-connect through the switch fabric of intermediate node 980. Intermediate node 980 may send the data frame to intermediate node 990 via a channel/sub-channel of link 962C. In the situation where the circuit identifier is only locally unique, intermediate node 980 may modify the data frame (e.g., by replacing the encoded circuit identifier with an encoded circuit identifier that is unique between intermediate node 980 and egress node 990), and transmit the modified data frame to intermediate node 990 via the channel/sub-channel of link 962C.

Intermediate node 990 may receive the data frame via the channel/sub-channel of link 962C. Assume that intermediate node 990 recognizes that a switch-over is to occur to protection path 960 based on the data in the data frame. Intermediate node 990 may read the encoded circuit identifier from the data frame and use the circuit identifier to identify protection path 960 and obtain information to facilitate establishing a cross-connect through the switch fabric of intermediate node 990. Intermediate node 990 may send the data frame to egress node 940 via a channel/sub-channel of link 962D. In the situation where the circuit identifier is only locally unique, intermediate node 990 may modify the data frame (e.g., by replacing the encoded circuit identifier with an encoded circuit identifier that is unique between intermediate node 990 and egress node 940), and transmit the modified data frame to egress node 940 via the channel/sub-channel of link 962D.

Egress node 940 may receive the data frame via the channel/sub-channel of link 962D. Assume that intermediate node 940 recognizes that a failure has occurred on working path 950 from the data in the data frame. Egress node 940 may read the encoded circuit identifier from the data frame and use the circuit identifier to identify protection path 960 and obtain information to facilitate establishing a cross-connect through the switch fabric of egress node 940. Egress node 940 may send the data frame to client B.

At some point, the failure on link 952B may be repaired and operations similar to those described above may be performed to restore working path 950.

Conclusion

Implementations described herein may facilitate the switch-over from a working path to a protection path. Rather than using control messages transmitted over a control layer, implementations described herein may use information, in the overhead portion of a data frame transmitted over a data layer (of the protection path), to instruct network nodes to switch over from the working path to the protection path. Using the data layer may result in a faster switch over to the protection path than using the control layer.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7 and 8, the order of the blocks may be modified in other implementations. Further, non-dependent blocks may be performed in parallel.

Also, certain portions of the implementations have been described as "components" that perform one or more functions. The term "component," may include hardware, such as a processor, an application specific integrated circuit (ASIC), or a field programmable gate array (FPGA), or a combination of hardware and software.

Further, it has been described that a circuit identifier is encoded in a TTI field of an overhead portion of a data frame. In another implementation, the circuit identifier may be encoded within another field in the overhead portion of the data frame.

Further, while implementations have been described in the context of an optical network, this need not be the case. These implementations may apply to any form of circuit-switching network.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A first node of a plurality of nodes connected by links and associated with first and second paths, the first node comprising:

one or more components to:
   detect a failure on the first path, the first path being a working path, establish a connection associated with the second path when the failure on the first path is detected, the second path being a protection path, encode a circuit identifier within a trail trace identifier (TTI) field in an overhead portion of a data frame that complies with ITU-T G.709, the data frame carrying a client signal after the failure on the first path is detected, the circuit identifier identifying the second path, such that a second node of the plurality of nodes establishes a connection associated with the second path, and transmit the data frame with the encoded circuit identifier to the second node via the second path.

2. The first node of claim 1, where the second path is one of a plurality of second paths; and where, when establishing the connection associated with the second path, the one or more components are configured to:

select one of the plurality of second paths, and establish a connection associated with the selected one of the plurality of second paths.

3. The first node of claim 1, where the first node includes a switch fabric; and where, when establishing the connection associated with the second path, the one or more components are configured to establish a connection through the switch fabric to connect a first one of the links to a second one of the links, where the first one of the links and the second one of the links are associated with the second path.

4. The first node of claim 1, where the TTI field and further includes an identifier associated with the at least one of the plurality of nodes.

5. The first node of claim 1, where the circuit identifier is a unique identifier among identifiers used by the plurality of nodes.

6. The first node of claim 1, where the circuit identifier is a unique identifier used only between the first node and the second node.

7. A method performed by a node of a plurality of nodes, the method comprising:

detecting a failure on a first path, the first path being a working path;

establishing a connection associated with a second path when the failure on the first path is detected, the second path being a protection path;

providing, after the failure on the first path is detected, an identifier in a trail trace identifier (TTI) field, the TTI field being in an overhead portion of a data frame, the data frame including a payload portion that contains a client signal, and the identifier identifying the second path, such that another one of the plurality of nodes establishes a connection associated with the second path; and transmitting the data frame to the other one of the plurality of nodes via the second path.

8. The method of claim 7, where the second path is one of a plurality of second paths; and where establishing the connection associated with the second path includes:

selecting one of the plurality of second paths, and establishing a connection associated with the selected one of the plurality of second paths.

9. The method of claim 7, where the identifier is a unique identifier among identifiers used by the plurality of nodes.

10. The method of claim 7, where the identifier is a unique identifier used only between the node and the other one of the plurality of nodes.

11. A node of a plurality of nodes associated with first and second paths, the first path being a working path and the second path being a protection path, the node comprising:

one or more components to:

receive a data frame from another one of the plurality of nodes, the data frame being compliant with ITU-T G.709 and including a payload portion having a client signal, the data frame also having an overhead portion that includes a trail trace identifier (TTI) field, the TTI field including an encoded circuit identifier, which identifies the second path, establish, based on the encoded circuit identifier, a connection associated with the second path, and transmit the data frame to a further node of the plurality of nodes via the second path.

12. The node of claim 11, where the second path is one of a plurality of second paths; and where, when establishing the connection associated with the second path, the one or more components are configured to:

select one of the plurality of second paths, and establish a connection associated with the selected one of the plurality of second paths.

13. The node of claim 11, where the node includes a switch fabric; and where, when establishing the connection associated with the second path, the one or more components are configured to establish a connection through the switch fabric to connect the second path.

14. The node of claim 11, where the TTI field further includes an identifier associated with the at least one of the plurality of nodes.

15. The node of claim 11, where the circuit identifier is a unique identifier among identifiers used by the plurality of nodes.

16. The node of claim 11, where the circuit identifier is a unique identifier used only between the node and the other one of the plurality of nodes.

17. The node of claim 11, where the one or more components are further configured to modify the data frame by replacing the encoded circuit identifier with a different encoded circuit identifier that is unique only between the node and the further node.

18. The node of claim 11, where the plurality of nodes form a Generalized Multi-Protocol Label Switching (GMPLS) network.

19. A method performed by a node of a plurality of nodes, the method comprising:

receiving a data frame from another one of the plurality of nodes, the data frame being compliant with ITU-T G.709 and including a payload portion storing a client signal, and an overhead portion that includes a trail trace identifier (TTI), which has an encoded identifier, the encoded identifier identifying the second path, the first path being a working path and the second path being a protection path;

establishing, based on the encoded identifier, a connection associated with the second path; and transmitting the data frame to a further node of the plurality of nodes via the second path.

20. The method of claim 19, where establishing the connection associated with the second path includes:

extracting the encoded identifier from the data frame, obtaining, based on the encoded identifier, information to establish the connection associated with the second path, and
establishing the connection through the node using the information to establish the connection associated with the second path.

21. The method of claim 19, further comprising:
modifying the data frame by replacing the encoded identifier with a different encoded identifier that is unique only between the node and the further node; and
where transmitting the data frame includes transmitting the modified data frame.

22. A network, comprising:
an ingress node;
an egress node; and
an intermediate node;
where the ingress node and the egress node are connected via first links associated with a first path, which is a working path, and via second links associated with a second path, which is a protection path;
where the ingress node is configured to:
    detect a failure on the first path,
    establish a connection associated with the second path when the failure on the first path is detected,
    encode, after the failure on the first path is detected, an identifier within a trail trace identifier (TTI) field, the TTI being in an overhead portion of a data frame that complies with ITU-T G.709 and carries a client signal, the identifier identifying the second path, and
    transmit the data frame with the encoded identifier to the intermediate node via the second path; and
where the intermediate node is configured to:
    receive the data frame from the ingress node,
    identify, via the encoded identifier, that a switch-over is to occur to the second path,
    establish, based on the encoded identifier, a connection associated with the second path, and
    transmit the data frame on the second path.

23. The network of claim 22, where, when establishing the connection associated with the second path, the intermediate node is configured to:
    extract the encoded identifier from the data frame,
    obtain, based on the encoded identifier, information to establish the connection associated with the second path, and
    establish the connection through the intermediate node using the information to establish the connection associated with the second path.

24. The network of claim 22, where the intermediate node is further configured to:
    modify the data frame by replacing the encoded identifier with a different encoded identifier that is unique only between the intermediate node and another node that represents a next hop on the second path; and
    where, when transmitting the data frame, the intermediate node is configured to transmit the modified data frame.

25. The network of claim 22, where the ingress node, the egress node, and the intermediate node form a Generalized Multi-Protocol Label Switching (GMPLS) network.

* * * * *